Figure 1:
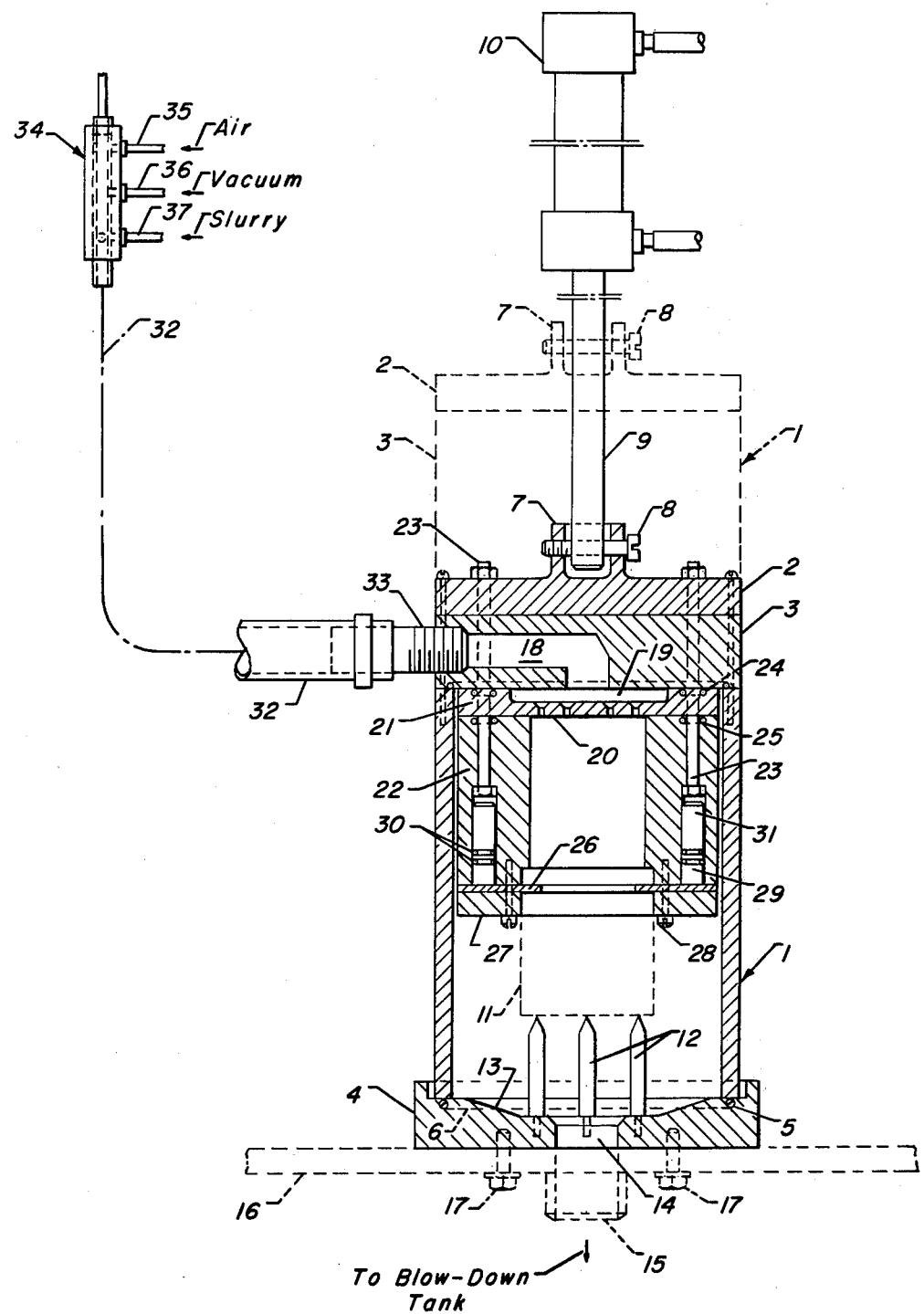

United States Patent [19]

Hoyer et al.

[11] 4,039,482

[45] Aug. 2, 1977

[54] METHOD OF COATING AND IMPREGNATING CATALYST SUPPORT MEMBERS

[75] Inventors: William A. Hoyer, Evanston; Lowell W. Johnson, Fox Lake, both of Ill.

[73] Assignee: Universal Oil Products Company, Des Plaines, Ill.

[21] Appl. No.: 616,750

[22] Filed: Sept. 25, 1975

Related U.S. Application Data

[62] Division of Ser. No. 516,525, Oct. 21, 1974, Pat. No. 3,948,213.

[51] Int. Cl.² ............... B01J 21/04; B01J 23/40; B01J 35/04
[52] U.S. Cl. ............... 252/466 PT; 252/463; 252/477 R; 427/294
[58] Field of Search ............ 252/463, 466 PT, 477 R; 427/294

[56] References Cited

U.S. PATENT DOCUMENTS

| | | | |
|---|---|---|---|
| 1,723,747 | 8/1929 | Pearce | 427/296 |
| 3,186,895 | 6/1965 | MacDonald | 427/294 |
| 3,554,929 | 1/1971 | Aarons | 252/477 R |
| 3,767,453 | 10/1973 | Hoekstra | 252/463 X |

*Primary Examiner*—W. J. Shine
*Attorney, Agent, or Firm*—James R. Hoatson, Jr.; Philip T. Liggett; William H. Page, II

[57] ABSTRACT

A liftable housing form of pressure tight treating chamber is especially adapted to providing multiple stage treatments to catalyst support members, such as honeycomb-type elements, in order to place a catalytic coating on all of the interior surfaces of the multiple passageways through the elements. Power operated lifting of an open-bottomed housing permits the placement of members on sharp edged pin support means in the interior of the chamber such that passageways will not be blocked while the element is being subjected to vacuum, liquid coating, and air blowing stages.

6 Claims, 3 Drawing Figures

METHOD OF COATING AND IMPREGNATING CATALYST SUPPORT MEMBERS

This is a division of application Ser. No. 516,525, filed Oct. 21, 1974, now U.S. Pat. No. 3,948,213.

The present invention relates to an improved type of treating chamber which will provide for the multiple stage treating of catalyst Support members to effect a catalytic coating thereon.

More specifically, the invention is directed to a special form of pressure tight chamber for handling multiple treating streams and which will have a liftable housing and lower internal pin support means to accommodate the insertion and removal of a catalyst supporting unit, such as a honeycomb type of element, in an elevated position to receive an unblocked, full flow-through of the various treating streams in the successive stages.

The need to remove or convert the noxious components in vehicular exhaust gases is now well known as a means for overcoming air pollution. Also, the present and proposed future requirements for having catalytic exhaust gas converters on motor vehicles are quite well known. The catalysts for the various forms of converters are, at this time, being manufactured and supplied in two general forms, namely: (1) as catalytically coated rigid skeletal monoliths, or honeycomb type of elements, where there are a multiplicity of longitudinal passageways in each unit in order to provide a high surface area; and (2) as confined batches or beds of catalytically coated particulates which, in turn, may be generally spherical or of small pellet form, with nominal diameters and lengths in the 1/16 inch to 5/16 inch range.

The spheres and pellets are of advantage as catalyst support material to the extent that they can be made from refractory inorganic oxides, typically of alumina, or of alumina with one or more other oxides as additives to help stabilize for strength, heat resistance, etc., such that they have surfaces with high porosity and large resulting actual surface areas as compared to the more dense "ceramic" monoliths. On the other hand, pills and pellets are far more fragile than the rigid, monolithic type of honeycomb elements and are more easily broken when placed in service on an auto or truck. The small spheres or pellets are especially subject to exhaust gas pulsations from the engine operation such that a breakage rate can be quite high for loosely packed beds of these rather fragile members. The rigid monolithic, honeycomb structures are typically made from ceramics which comprise refractory crystalline materials such as sillimanite, magnesium silicates, zircon, petalite, spodumene, cordierite, aluminosilicates, mullite, or combinations thereof, etc. Such materials are generally considered to have a porous surface; however, as heretofore noted, their surfaces are not highly porous to the same extent as obtained with a lower bulk density alumina pill or extrudate and it is generally advisable to provide an alumina coating over the skeletal structure prior to effecting surface impregnation with the catalytically active component. These monolithic, substantially catalytically-inactive crystalline support members have been described in prior art patents, as for example in Keith et al U.S. Pat. Nos. 3,331,787 and 3,565,830, such that it is not deemed necessary to describe them in detail herein.

Typically, the catalytic component will comprise a noble metal such as platinum or palladium, or a mixture thereof, for providing a highly active oxidation catalyst; however, other active metals may well be used to provide a particular type of catalytic coating. Actually, it is not intended to limit the present invention, which is being directed to coating apparatus and to coating systems, to any one specific type of catalyst coating or coatings, inasmuch as oxidation catalyst materials may comprise the metals of Groups I, V, VI and VIII of the Periodic Table, particularly copper, silver, vanadium, chromium, iron, cobalt, nickel, platinum, palladium, with a component being used singly or in combination with one or more other active component.

Reducing coatings may comprise oxides of copper or of copper-iron, copper-nickel, etc., as well as platinum group metals.

While the use of catalyst coatings on particulates and on rigid skeletal elements, as well as various methods of applying coatings, have been known for some years, there is no knowledge of prior art apparatus and systems suitable for effecting a high volume production of catalytically coated elements suitable for use in automobile exhaust gas converters. For example, the aforementioned U.S. Patents set forth various methods for coating a refractory honeycomb type of member with alumina and an active catalytic coating. However, dipping and spraying operations are not nearly rapid enough to provide a good assembly-line production system which will permit, for example, the coating of an element with alumina, or the catalytic impregnation of a coated element, in a time period of less than one and one-half minutes to two minutes. Also there have been no known prior art teachings with regard to using vacuum treating on a rigid skeletal member in order to more rapidly degassify or "out-gas" the substrate and provide an improved fast coating procedure.

It is thus a principal object of the present invention to provide a special chamber which will make possible the rapid multiple stage treatment of catalyst elements such that they can be catalytically coated in an optimum manner.

In another aspect, it is an object of the invention to provide a pressure tight chamber such that there can be vacuum treating of support members, as well as a subsequent pressurized air blowing of coated members.

It is also an object of the present invention to provide a special form of chamber construction and design which will permit a short contact time between the coating stream and the element, as well as short contact times for air or other fluid streams which are to be brought into contact with an element.

Still another object of the present invention is to provide a multiple chamber arrangement, such as a multiplicity of chambers on a moving belt or rotating table unit, whereby a multiplicity of chambers can, in turn, handle a multiplicity of elements at one station or general locale.

In one embodiment the present invention provides a treating chamber for use in effecting the multiple stage treatments of catalyst support members to provide a catalyst coating thereon, which comprises in combination, an open-bottomed liftable housing section, power operated means connective to such section for effecting the periodic lifting thereof, a base section, a seal means for accommodating the lower periphery of said housing section and for providing a pressure tight seal between said two sections, spaced support pins projecting into the lower central portion of the zone above the base section and providing for an unobstructed fluid flow through a catalyst support member which is placed therein, a fluid drain means from said base section within the confines of said liftable housing section and said seal means, valve means for said drain means, at least one conduit means to the upper interior portion of said housing whereby fluid steams may be brought into the interior of said housing and into the passageways of said member to effect a thorough contacting of the surfaces thereof, and valving means for said conduit means to regulate various fluid flows to the interior of said chamber.

In a quite broad aspect relating to effecting the coating of a rigid, ceramic honeycomb type catalyst support member, there is provided an improved method of coating by subjecting the member to vacuum treating just prior to its being contacted by the coating material, whereby there can be a rapid, improved coating placed on the member.

In another more specific embodiment, the present invention will provide a method for effecting the rapid and uniform coating of catalyst support members, in a manner which comprises the steps of: (a) placing the member(s) in a pressure tight chamber; (b) exerting a vacuum on the member(s) to remove entrapped air from surface pores; (c) while having the member(s) in a degassed condition, effecting the filling of the chamber with a desired coating solution; (d) maintaining a short period of superatmospheric pressure on the thusly filled chamber to insure the filling of pores; (e) subsequently effecting a release of pressure and the removal of the encompassing solution; (f) providing the blowing of pressurized air over the surfaces of the thusly coated member(s) to remove excess solution and to preclude any undesired passageway blockages; and then (g) effecting removal of the resulting coated member(s) from said chamber.

The present apparatus and method of operation is particularly directed to effecting the coating of rigid skeletal structures, such as honeycomb-type elements with a multiplicity of small parallel passageways; however, the same equipment and method of operation may well be utilized to advantage in connection with effecting the rapid catalytic coating of contained beds, or batches, of subdivided catalyst support particulates such as small spheres or pellets which have been formed of refractory inorganic oxide materials.

Typically the outer pressure tight housing for the chamber will be constructed and arranged so as to be lifted by an air cylinder or other fluid power motor means and will have an O-ring or other suitable gasket means on or engageable with its lower periphery to effect a pressure tight seal with a base member. The housing will be liftable for a sufficient distance to effect the insertion and removal of a catalyst support element which will undergo the various treating stages to effect a rapid and efficient coating operation. The lower interior portion of the chamber will also be provided with suitable sharp edged element supporting pins upon which the element can rest without having undue blocking of any of the passageways. For a honeycomb type of element, it will preferably be inserted in a manner to be positioned with vertical orientation for its plurality of passageways, whereby there can be a downward flow of coating materials through the passageways and a subsequent downward blowing of pressurized air therethrough, whereby excess fluid will be forced into a lower drain arrangement to effect the removal of coating materials not adsorbed by the surfaces of each element.

A preferred form of chamber will also have a flexible ring or gasket means which will project laterally inwardly from around the interior periphery of the chamber at a height which will slightly overlap the upper peripheral edge of an inserted element and substantially preclude a downward flow of treating fluid streams around the outside wall of the element and within the annular space between the outside wall of the element and the inside wall of the chamber. In other words, for a honeycomb type of element all fluid streams will be channeled into the multiplicity of passageways which will eventually be utilized for conversion purposes in a particular converter or reactor.

Also, a fluid stream distributing section is desirably provided in the upper portion of the chamber such that there will be substantially uniform flow down through the chamber for its full cross-sectional width. A single fluid inlet to the upper portion of the fluid distributing section may be provided or, alternatively, a plurality of inlets may be provided so as to independently introduce the various treating streams for the sequential stages of treatment. Although not a part of the present improved lifting-wall form a chamber, a preferred system of operation will provide for automatic valving (through the use of rotating valve means or otherwise) which will effect the sequential flow of the different fluid streams to the chamber itself. For example, there may be the sequential provisions for vacuum and degassification of an element; the flow of treating fluid; pressure application to a filled chamber; and, high pressure air blowing to effect both a removal of excess fluid and a partial drying of the coating on the element. In connection with the valving arrangement, there will, of course, be suitable timing means in order to effect the desired periods of contact for each of the sequential streams as well as timing for the raising and lowering of the chamber wall to provide for the insertion and removal of the element.

A single pressure tight chamber may be designed and constructed to accommodate more than one rigid skeletal element, or more than one container means for a batch of subdivided catalyst support material. Also, as will hereinafter be described more fully, there may be an apparatus arrangement, such as through the use of a rotating table means, where a multiplicity of chambers are provided in one area in a manner to effect the sequential treating of a plurality of catalyst support means so as to have a continuous assembly-line operation. In other words, an element can be loaded into a chamber (as one of a plurality of chambers) from which the previously coated element has been removed and the chamber then rotated in a circle through timed stages where there will be closing of the chamber and subsequent sequential openings and closings of valves to effect the desired sequential stage treating of the enclosed element whereupon completion of the circle there will be an opening of the chamber and an unloading of a treated element whereby the chamber will then be reloaded at the next incremental movement of the table to provide a treating cycle for another element. Depending upon the size or diameter of the particular rotating table, any convenient number of chambers may be mounted to in turn provide for the treating of a multiplicity of elements at the same time, but with each element being one stage behind a previously loaded element with respect to the direction of rotation for the table. Although a rotating table arrangement seems preferable and of advantage in a high production operation, there may also be suitable multiple chamber treating operations where the individual chambers are being utilized in straight line operations utlizing straight line conveyor movement means. Alternatively, there may well be batch operations where a plurality of chambers are loaded simultaneously so as to provide a simultaneous treatment of the encased catalyst support members.

As heretofore stated, there have been no known procedures or known apparatus which provide for a vacuum treating of the ceramic type catalyst support members in order to preclude the trapping of air in surface pores and as a means of insuring the rapid flow of a coating slurry or solution into the interior of the surface pores. Although all of the advantages may not be presently understood, it does appear that a greater quantity of coating material can be placed on a support member following a vacuum, degassing operation, in comparison to dipping operations. It is also believed that there may be better or more complete filling of pores so as to hold a greater quantity of coating material as well as perhaps obtain a better binding or "locking" of the coating material onto the surface of the element.

A pressure tight chamber is not only of advantage in permitting a vacuum operation, but is particularly helpful in permitting the pressurized air blowing of members following the coating stage. The high pressure air stream can rapidly remove excess slurry or solution from the member surfaces and preclude the blocking of small honeycomb channels before the coated support member has a chance to be fully dried.

Reference to the accompanying drawings and the following descriptions thereof will serve to assist in illustrating the design and operational advantages of a chamber adapted to hold a single support element, as well as illustrate how a plurality of chambers may be arranged on a rotating table means to provide for the sequential treatment of a multiplicity of elements at the same time.

Specifically,

FIG. 1 of the drawing shows a cross-sectional elevational view through a single element holding chamber which is provided with a lifting housing construction to in turn permit the rapid insertion and removal of a rigid skeletal element.

Figure 2:
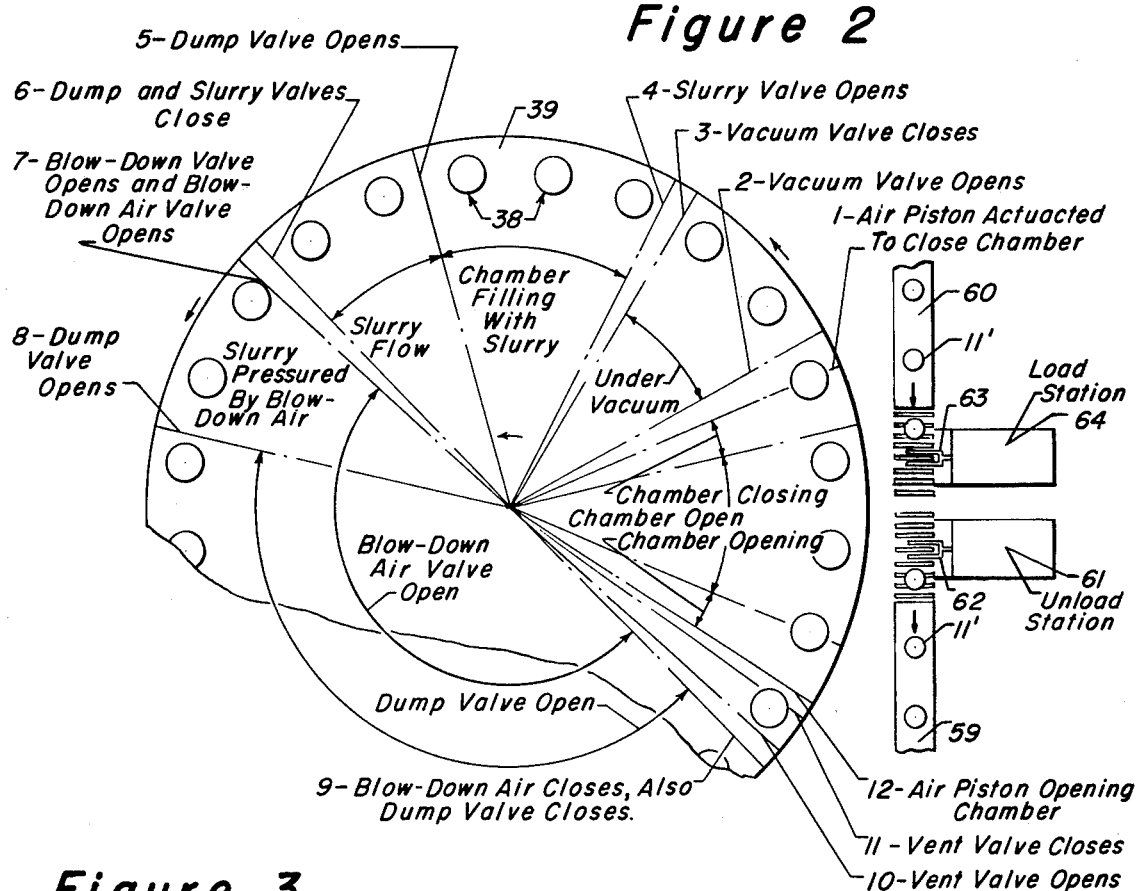
Figure 3:
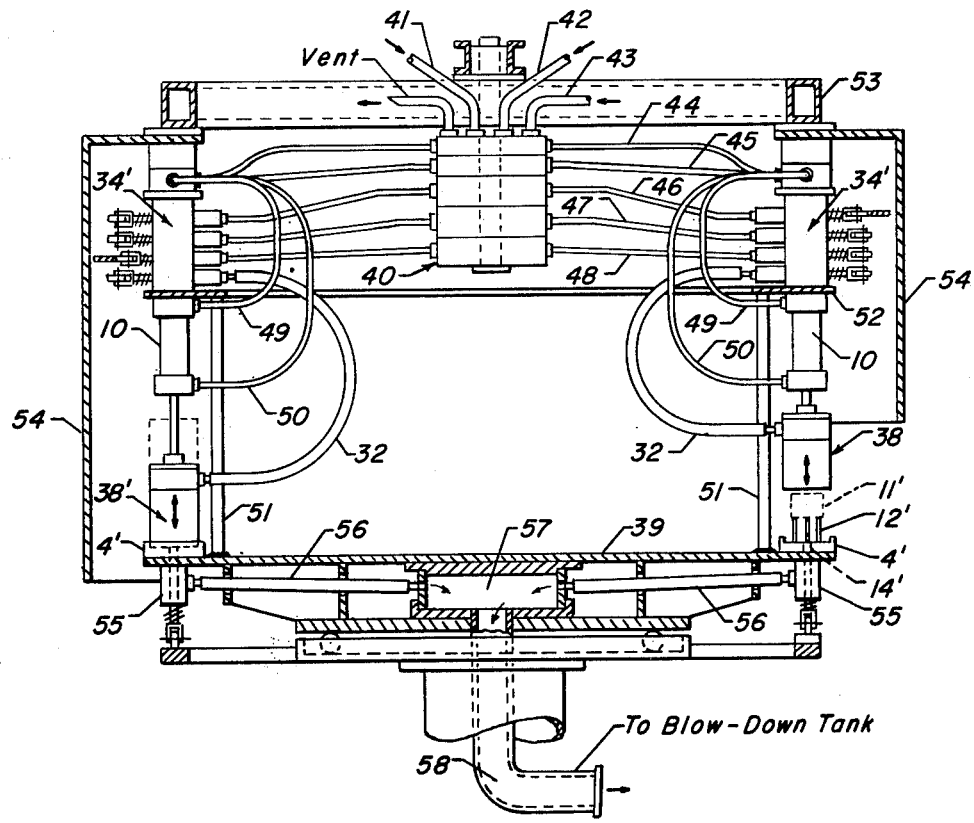

FIGS. 2 and 3 illustrate in, respectively, plan and elevational views how a plurality of chambers may be arranged on a rotating table support means to provide for the sequential and stage-wise treating of a plurality of elements in a rapid continuous manner.

Referring now particularly to FIG. 1 of the drawing, there is shown a pressure tight chamber having a lifting wall or housing section 1 with top sections 2 and 3. A lower base section 4 is shown as being provided with an O-ring seal member 5 in groove means 6 such that the lower end portion of housing section 1 can effect a pressure tight seal with the base member. Alternatively, a suitable gasket or seal ring means could be attached to the lower end of wall section 1.

On the upper plate or top member 2 there are provided upwardly projecting flange members 7 to accommodate pin means 8 which will, in turn, connect with a piston rod means 9 for piston member 10, whereby the latter can periodically effect the desired raising and lowering of the entire upper chamber portion including the housing wall portion 1 such that a catalyst support element, indicated at 11, may be inserted into the interior of the chamber, as well as removed therefrom, for the coating operation.

Also in accordance with the present invention, pin support means such as pointed top pins 12, are provided to support the catalyst element 11 so that the passageways through an element will not be blocked with slurry or other coating materials. Also, spaced apart pins will permit element lifting blades to be inserted between pins and provide for the mechanical placement and removal of a support member from the support pins. In the present instance, pins 12 are mounted from base member 4 and are centrally located in order to, in turn, provide for the central positioning of an element 11. Preferably, the pins are removably mounted such that different length pins could be used where needed to accommodate a different height element to be treated in the chamber, or be removed and replaced after excessive wear. Base member 4 is also provided with a sloping surface portion 13 tapered toward a central opening 14 providing for an outlet port from the treating chamber. A suitable outlet nozzle means 15 is also indicated as being provided within a supporting table or platform 16 whereby there can be a fluid outlet conduit means or other suitable passageway means carried to a blowdown tank, not being shown in the present drawing. For construction and assembly purposes, bolts 17 are indicated as attaching base plate 4 to the table or other support means 16.

Various methods of construction may be utilized in connection with effecting the detailed design and construction of the present improved form of chamber; however, as shown in the present drawing, a plurality of internal pieces are utilized to provide for the introduction of the various fluid streams by way of a single fluid inlet passageway 18. The latter is provided within the upper head section 3 while a wide and shallow fluid distributing zone 19 is provided above a perforated transverse portion 20 in a separate plate section 21. The latter is, in turn, clamped between a lower internal cylindrical section 22 and the lower face of the upper section 3 by means of spaced long bolt members 23. Fluid sealing members, such as O-rings 24 and 25, are indicated around the clamping bolt members 23 at the interface between members 21 and 3, as well as between the lower face of 21 and the cylindrical member 22, in order to preclude fluid leakage into the bolt passageways.

Also, as previously noted, the preferred arrangement provides for a flexible seal ring 26 at a location within the chamber to lap around the upper peripheral edge of a support member, such as 11, which will be introduced into the movable wall chamber for treating and coating. Specifically, the flexible seal member 26 is indicated as being clamped around the lower edge of cylindrical member 22 by means of clamping member 27 and spaced bolts 28. In the event that screens or other perforate container means would be utilized to hold a batch of pills or pellet-form catalyst support members in a position indicated by the dashed lines 11, in a manner similar to the positioning of a rigid skeletal member or honeycomb element, then flexible seal member 26 may have a somewhat different configuration, or perhaps be eliminated, to better accommodate fluid stream flow into and around the subdivided catalyst support elements. It will also be noted that plug means 29 with O-ring means 30 have been shown in the recesses or drilled holes 31 accommodating the heads of bolts 23 so as to preclude fluid flow upwardly around the bolts 23 when the chamber is being pressurized. In order to have the present pressure tight chamber accommodate different sized, or different shaped members, there may be the replacement of internal member 22 or perhaps members 26 and 27, so as to fit a particular sized catalyst support element.

As a part of the overall system to be used with the present movable wall chamber, the drawing indicates a conduit means 32 connecting through nipple means 33 to fluid inlet port 18 within the upper portion of the chamber and such conduit means 32 also being connective with a multiple port valving means at 34. The latter is indicated diagrammatically as providing means for separately introducing various treating fluid streams into conduit 32 and into the treating chamber, as for example: a pressurized air stream from inlet 35; a vacuum treating stage from port 36; and a fluid treating stream by way of nozzle 37. A mechanically or electrically operated rotating valve stem or cam operated, spring biased valve plugs, etc., may be utilized in connection with the multiple port valving means 34 to provide for the timed introductions of the various treating streams to the treating chamber and it is not a part of the present invention to be limited to any one type of manifold valving means which would effect the sequential introduction of a plurality of treating streams for various treating stages.

Also, it is not intended to limit the present invention to the utilization of any one type of construction materials for the present improved chamber inasmuch as the materials should be chosen to accommodate the particular treating streams being utilized within the chamber. For example, if only non-corrosive materials are to be handled, then various types of metals and plastics may well be utilized for the internal sections, as well as for the chamber wall construction. On the other hand, where the chamber is to be utilized for effecting a final catalyst coating or impregnating stage on support elements with an acidic impregnating solution, as for example, chloroplatinic acid and/or palladium chloride, then the entire internal portions of the chamber should be constructed of acid resistant metals, such as tantalum, or acid resistant types of plastic, or of suitable plastic coated metals, whereby there will be a long life for the chamber under continuous operating conditions.

With specific reference to FIGS. 2 and 3 of the drawing, there is indicated an arrangement where a plurality of chambers, such as illustrated and described in connection with FIG. 1 of the drawing, may be utilized to provide for simultaneously and continuously carrying out treatments on a plurality of catalyst support elements to thus result in a high production, continuous manufacturing procedure. In FIG. 2, which provides a partial plan view of a rotating table system, there is indicated by circles 38 an arrangement where a multiplicity of chambers may be mounted on a rotating support table 39 to permit a continuous production system, with rapidly timed loadings and unloadings being effected to accomplish the desired high production coating procedure. As best shown diagrammatically in FIG. 3, an individual chamber at 38 is indicated as having its wall portion raised to insert an element 11' on pin support means 12' while at 38' there is indicated a closed chamber with its wall means tight against base portion 4' and its enclosed element still undergoing treatment prior to being removed at an "unloading station" which will be provided sequentially ahead of the "load station". In connection with each chamber 38 there will be suitable means for lifting its outer wall or housing section by an air cylinder means 10 and a fluid stream inlet conduit means 32, all as indicated diagrammatically and described in connection with FIG. 1 of the drawing. Thus, there will be a suitable mechanically operated valving manifold system at each of the zones 34' and each will have a plurality of suitably operated valving means to effect sequential timed feedings of a desired stream through the conduit means 32 to the interior of each chamber 38. In addition, there will be a suitable central fluid distributing means at 40 to take care of venting and accommodate air, vacuum treating and liquid treating streams, such as at conduit inlet means 41, 42 and 43 and in turn sequentially distributing such streams through a plurality of conduits or flexible hoses 44, 45, 46, 47 and 48 which will, in turn, be connective with the plurality of timed valving means 34'. There is also indicated the utilization of conduit or hose means 49 and 50 that are connective with the plurality of fluid power cylinders 10 which will effect the raising and lowering of the movable wall sections of chambers 38 in accordance with a desired timing sequence.

Various structural aspects for the rotating table unit of FIG. 3 are merely diagrammatic and should in no way be considered limiting with respect to the present invention. For example, there are indicated a plurality of supporting posts 51 from rotating table 39 and a circular ring-form plate means at 52 along with tubular-form support ring means 53 to effect the supporting of the valving and superstructure means for the upper portion of the rotating table assembly. There is further indicated the placement of an encompassing shield member 54 around the entire superstructure as well as around the plurality of treating chambers 38. In connection with the rotating table portion 39 which is utilized to hold the plurality of base portions 4' for the chambers 38, there is additionally indicated the placement of spaced valving means 55 which will start and stop flow from blow-down drain portions 14' for each base section 4' whereby treating liquids as well as blow-down air can be channeled into and through conduit means 56 to collector zone 57 and from the latter through passageway or conduit means 58 to a blow-down drain area not shown. Various mechanical means as well as motive power means may be used to effect the continuous or start and stop rotation of the table 39, as well as the entire superstructure associated therewith, including the multiplicity of chambers 38 mounted above table 39.

In connection with FIG. 2 of the drawing, which indicates diagrammatically the placement and use of a plurality of chambers 38 at spaced distances around the periphery of table 39, there is also indicated diagrammatically the utilization of conveyor means at 59 and 60 to provide, respectively, for the unloading of treated elements 11' at an unloading station 61 by mechanically operated lift blade means at 62 as well as the loading of elements 11' by means of blade means 63 from a load station at 64. FIG. 2 further indicates diagrammatically, by virtue of dashed radial lines numbered (1) through (12), how the various valves connective with conduits 32 will be operated to effect the desired stages of treatment for a catalyst support member within a single chamber 38 as it is being rotated stage-wise in a timed manner around with the rotating table member 39 from the load station at 64 to the unload station at 61 (with the table rotation in this instance being in a counter-clockwise direction).

FIG. 2 is of advantage in also indicating certain segmental zones between the radial dashed lines and the operating condition within the chamber for the particular segment. For example, there are indications as to when the chamber is being opened and closed; a segment for the time period for which the chamber is under vacuum; the positioning while the chamber is being filled with treating fluid; fluid pressurization; and a blow-down of air to remove excess treating fluid and effect at least a partial surface drying of the element prior to its being removed from the chamber and its placement on the conveyor means to be carried to a further treating stage, to a packaging stage, or wherever. Typically, in a preferred method of catalyst support coating and/or impregnation procedure, there will be high temperature drying and/or calcining of a coated element in a treating oven for a desired period of time, which may be for a period of time up to an hour or more.

As heretofore pointed out, the present improved pressure tight chamber, as well as the moving table arrangement adapted to accommodate a plurality of individual chambers, permits a treating system which can be carried out in a rapid manner, as for example in a period of time from 1 to 2 minutes, or less, as compared to the slow time consuming procedure which would involve a handling of elements in a dipping procedure or a spraying procedure for the various coating and/or impregnating fluids. Specifically, the pressure tight treating chamber permits a rapid degassifying of an element, or of a plurality of elements, such that the pores of an element are susceptable to rapid coating, as well as the uniform coating of surfaces and pores being accomplished in a manner of seconds, as compared to the dipping or spraying of an element where entrapped air within pores must be displaced by gravity flow from liquid coating materials that must slowly work their way into the surface pores. The use of high pressure air through and around a particular catalyst support structure also provides a more rapid removal of excess fluids from surfaces and a more rapid formation of skin drying without having large pore blockage or passageway blockage, particularly when compared to liquid removal by drippage and by drying carried out in the presence of a non-pressurized air stream within an unconfined, open zone.

EXAMPLE I

As indicative of the benefit of vacuum treating a ceramic honeycomb member of a rigid crystalline rafractory material, there are data which compare the amount of alumina coating retained following an atmospheric pressure dipping procedure and following a vacuum-dipping procedure.

Specifically, in one test procedure, a series of six Corning substrates, or "honeycomb elements" of the EX-20 Type, (cordierite-$2MgO \cdot 2Al_2O_3 \cdot 5SiO_2$) were subjected to an approximate two-minute period of dipping in an aqueous alumina slurry having about 25% alumina solids in the slurry. The dipped substrates, or elements, were shaken to remove excess slurry and to insure the unblocking of channels through the substrate. The average wet weight gain for each was approximately 32.32 grams.

In a different test procedure which incorporated vacuum treating, six EX-20 elements of the same size were each subjected to placement in a closed chamber having an alumina slurry of the same type and composition as used for atmospheric dipping. In each instance, the elements were below the surface of the slurry and the chamber subjected to a vacuum of about 25 inches of mercury for about one minute. The vacuum was released to permit an atmospheric pressure buildup and then vacuum again applied for about one minute. During these out-gassing steps air bubbles were observed to be rapidly leaving the substrates. In each instance, after this vacuum-dip procedure, the substrates were removed from the alumina slurry and shaken to remove excess slurry and to insure the unblocking of passageways, as with the atmospheric dip procedure. For the vacuum-dipped substrates there was an average net weight gain of about 39.6 grams of alumina per element.

This weight gain is quite significant and it is believed that at least a part of the increase in weight was from the resulting flow of alumina coating into the unblocked surface pores of the vacuum-treated substrates.

EXAMPLE II

In order to further illustrate the use and advantage of the movable wall pressure tight treating chamber in effecting the coating of a catalyst support member, the following example is set forth. More specifically, there is illustratively described the placement of an alumina slurry coating onto a rigid skeletal structure, such as a honeycomb element with a plurality of parallel passageways, whereby a more porous surface is made available for a subsequent impregnation with a highly active catalytic agent.

Reference to FIG. 2 of the drawing may also be made in connection with the presentation of this illustrated example. Thus, initially an uncoated element will be loaded into a chamber 38 at the load station indicated at 64 while the chamber wall is in an elevated position. The element is, of course, supported on suitable sharp edge means (such as pins 12 in FIG. 1 of the drawing) whereby there can be good fluid flow down through the passageways of the element which, in the case of a honeycomb element, will be in a vertically oriented position. As the table rotates, there is the actuation of piston means 10 for the particular chamber 38 such that chamber closing is effected, as indicated by the radial line 1, and there is a pressure tight seal at the lower edge of the chamber against gasket means on the base portion 4 to result in a pressure tight closed chamber. After the closing of the chamber, as indicated by radial line 2, there will be an opening of a vacuum control valve which, in turn, connects the interior of chamber 38 to a vacuum source to provide for the degassing and evacuation of the element within the chamber. This operation will normally be carried on for a short period of time of from 5 to 10 seconds as indicated in the travel space between radial lines 2 and 3. The vacuum valve is then closed and at radial line 4 a liquid alumina slurry control valve is opened such that the interior of the chamber 38 will be filled with a suitably slurry mixture of alumina and water. The slurry flow is continued after the chamber has been permitted to completely fill and as indicated at radial line (5) a dump valve (such as valving means 55 below opening 14' in base section 4' ) will permit a continuous flow of slurry through the passageways of the element to insure adequate internal coating of the entire support structure. Also, as indicated at radial lines 6 and 7, the dump and slurry valves will close while an air valve is opened to provide for pressurized air on the slurry filled chamber to result in a pressurized forcing of the slurry medium into all passageways and all of the surface pores of the element. Typically, the pressurized operation will be for a period of 5 to 10 seconds in order to insure adequate coating of the entire surface of the element. Following the pressurized operation, there will be an opening of the dump valve, as indicated at the radial line 8, while there is a continuing flow of the pressurized blow-down air. The blow-down operation will typically continue for some 30–60 seconds in order to insure a substantially complete removal of all unadsorbed slurry from the internal surfaces of the element and also result in a partial drying of the element, at least to a stage where there will be no substantial gravity flow of slurry material which could block passageways. Then, as indicated at radial lines 9 and 10, there will be a closing of the blow-down air valve, as well as a vent valve opening such that there is a depressurizing of the interior of the chamber and making it ready for the opening of the chamber wall to remove the coated element. Subsequently, as indicated at radial lines 11 and 12, there will be the closing of the vent valve and an operation of the air piston 10 to effect an opening of the chamber wall so that following such opening there can be the removal of a partially dried and coated element at unloaded station 61. The element may be then placed on conveyor belt means 59 for transfer to a further drying and heating step, which typically will include high temperature drying of the order of 800° to 1000° F. in a calcining oven means.

As heretofore noted, all of the foregoing steps can be carried out in a rapid sequential manner where each step will require merely a fraction of a second in some instances and only a few seconds at other instances whereby the entire operation, including a relatively long blowdown period with pressurized air, will only require some 90 to 100 seconds. By way of summary and for further clarification to indicate typical time periods for each stage of contact as the element is carried from stage to stage on the rotating table arrangement, the following tabular listing of stages and times is set forth.

| Operation | Approximate Time Period (In Seconds) |
|---|---|
| Chamber closing | 3 – 4 |
| Chamber under vacuum | 8 |
| Vacuum cut off and slurry valve opening | 1 |
| Chamber filling with slurry | 10 – 12 |
| Slurry flow | 8 |
| Dump valve closing and blow-down air opening | 1 – 2 |
| Pressurized slurry | 8 |
| Dump valve opening and continued air blowing | 40 – 50 |
| Dump valve closing and vent valve opening | 2 – 3 |
| Chamber opening | 3 |
| TOTALS: | 84 – 99 |

With a total time period which will include unloading a coated element and loading an uncoated element, which may take another 5–6 seconds, there is a total time period for rotation of the table in the range of from 90–105 seconds; however, it is to be understood that the time periods set forth are merely illustrative and not to be considered limiting in any way. The valve opening and closing periods will, of course, depend upon the types of valve mechanisms utilized and the motive power means used in connection therewith to effect the openings and closing thereof, while the treating periods may vary in accordance with the type of slurry and/or solution being utilized. Also temperature and humidity conditions that may be present at the particular environment to effect at least a preliminary drying to permit the further handling of the element may effect the overall time period.

EXAMPLE III

In a similar apparatus and in a similar procedure such as set forth in the previous example, there may be the coating and impregnation of an alumina coated element or porous refractory inorganic oxide elements, with a suitable active catalyst component. For example, utilizing the same type of equipment to effect the same sequential stages of contact, there may be the impregnation of an alumina coated honeycomb type of element with a noble metal catalyst material, such as with chloroplatinic acid and/or with palladium chloride so as to produce an active oxidizing catalyst element.

In this instance, the operation will follow all of the sequence of steps outlined in Example II, including vacuum degassification, liquid flow, liquid pressurization, and air blow-down so as to provide a partially dried impregnated element. Also, the periods of contact may be substantially as listed in the previous example such that again there is a rapid handling of each element to provide complete impregnation to a state ready for high temperature calcining within a period of time which may be from approximately 90 to 100 seconds, or perhaps from 60 to 120 seconds, depending upon specific contact times for a particular element and a particular type of contacting solution.

While the foregoing description of the apparatus, as well as the description set forth in the examples, has been directed to the coating and impregnation of a rigid honeycomb type of element, it is to be again noted that more than one element may be placed in the chamber at any one time or that batches of subdivided particles (such as small spheres or extruded pellets) may well be provided in suitable perforate container means and subjected to the multiple stage treatment within the pressurized chamber in order to effect the high speed production of catalyst elements. Also, in view of the use of a pressure tight chamber and pressurized fluid flows, there may well be provision for an upward fluid flow through the chamber to contact a substrate, as an alternative operation.

It is to be noted that the terms "element(s)" and "member(s)" are substantially synonymous or equivalent terms, as used herein with respect to the catalyst support structures.

We claim as our invention:

1. In the coating of catalytic support members, each of said members comprising a porous, rigid, skeletal structure having passageways and surface pores therein, the improved method for effecting a more rapid and uniform coating operation thereof, which comprises the steps of:
   a. placing the member(s) in a pressure tight chamber;
   b. exerting a vacuum on the member(s) to remove entrapped air from said surface pores;
   c. while having said member(s) in a degassed condition, effecting the filling of the chamber with a desired coating fluid comprising a liquid coating material containing a refractory inorganic oxide;
   d. maintaining a short period of superatmospheric pressure on the thusly filled chamber to insure the coating of said pores;
   e. subsequently removing the encompassing fluid;

f. providing the blowing of pressurized air over the surfaces of the thusly coated member(s) to remove excess fluid and to preclude any undesired passageway blockages; and then g. effecting removal of the resulting coated member(s) from said chamber.

2. The method of calim 1 still further characterized in that said support member is a honeycomb type of element with a plurality of parallel passageways and the placement thereof in the pressure tight chamber is made to have generally vertically oriented passageways whereby there may be a down flow of the fluid streams through such passageways.

3. The method of claim 2 still further characterized in that said honeycomb is subjected to coating with a slurry of alumina and water as said coating fluid to effect a resulting alumina coating for the passageways and the surface pores of said honeycomb element.

4. The method of claim 1 further characterized in that said support member comprises an alumina coated honeycomb type of element and such element is subjected to contact with a coating solution comprising a platinum group metal salt or acid to produce a resulting active oxidizing catalyst member.

5. The method of operation of claim 1 further characterized in that a plurality of separate pressure tight chambers are maintained in a spaced relationship on a movable support means providing for carrying each such chamber in a predetermined time period from a loading zone to an unloading zone, with each chamber of the plurality thereof undergoing at the loading zone a timed sequential placement of at least one of said support members, effecting each of the steps of (b) through (f) for each chamber and for the confined member(s) therein for a predetermined time period as each chamber is moved from the loading zone to the unloading zone; sequentially effecting the removal of the resulting coated member(s) from each chamber as it reaches the unloading zone, and then effecting the sequential movement of the chamber to the loading zone for its reuse in providing for the continuous handling of said support members and for effecting a continuous coating system.

6. The method of claim 5 still further characterized in that said movable support means for the plurality of chambers is circular and rotatable through 360°, whereby each individual chamber moves in a circular path as it leaves the loading zone and is returned thereto, and the encased said support members are likewise moving in a 360° path as the sequence of said steps are being carried out on such members.

* * * * *